(12) United States Patent
Matsuo et al.

(10) Patent No.: US 8,044,624 B2
(45) Date of Patent: Oct. 25, 2011

(54) LOAD CONTROL APPARATUS AND METHOD FOR PROCESSING DIAGNOSIS SIGNAL FOR THE SAME

(75) Inventors: Yosuke Matsuo, Nagoya (JP); Shigeru Takeuchi, Gamagori (JP); Taketoshi Sato, Kariya (JP)

(73) Assignee: DENSO CORPORATION, Kariya (JP)

( * ) Notice: Subject to any disclaimer, the term of this patent is extended or adjusted under 35 U.S.C. 154(b) by 759 days.

(21) Appl. No.: 12/153,281

(22) Filed: May 15, 2008

(65) Prior Publication Data
US 2008/0288134 A1 Nov. 20, 2008

(30) Foreign Application Priority Data

May 15, 2007 (JP) ................................. 2007-129291
Dec. 19, 2007 (JP) ................................. 2007-327316

(51) Int. Cl.
*H02P 1/04* (2006.01)

(52) U.S. Cl. ............ 318/432; 701/29; 322/59; 318/430; 361/32; 361/33; 361/34; 361/35; 361/37

(58) Field of Classification Search .................... 701/29; 322/59; 318/430, 432; 361/32, 33, 34, 35, 361/36, 37
See application file for complete search history.

(56) References Cited

U.S. PATENT DOCUMENTS

| 7,301,294 B2 * | 11/2007 | Ogino et al. ............. 318/400.05 |
| 2006/0082347 A1 * | 4/2006 | Asada ............................. 322/59 |

FOREIGN PATENT DOCUMENTS

| JP | A-7-15992 | 1/1992 |
| JP | A-11-263240 | 9/1999 |
| JP | A-2002-204593 | 7/2002 |

OTHER PUBLICATIONS

Office Action dated Jan. 19, 2009 in corresponding Japanese patent application No. 2007-327316 (and English translation).

* cited by examiner

*Primary Examiner* — John Nguyen
*Assistant Examiner* — Jordan Fei
(74) *Attorney, Agent, or Firm* — Posz Law Group, PLC

(57) ABSTRACT

A load control apparatus outputs a PWM signal to a switching element to control a load. The switching element is connected between a power supply and a grand in series with the load. An abnormal increase detecting unit outputs an abnormal increase detection signal when detecting abnormal increase in applied voltage, which is applied to the load, relative to target voltage. An abnormal decrease detecting unit outputs an abnormal decrease detection signal when detecting abnormal decrease in the applied voltage relative to the target voltage. An operating state monitoring unit outputs a normally operating signal when the load normally operates. A signal combining unit generates a combined signal by combining the abnormal increase detection signal, the abnormal decrease detection signal, and the normally operating signal and outputs the combined signal via a common signal output terminal.

19 Claims, 7 Drawing Sheets

FIG. 7

| DUTY SIGNAL | OPERATING STATE | PROTECTION/MULFUNCTION |
|---|---|---|
| 0% | OUTPUT OFF IRREGULAR STOP | · LOAD DISCONNECTION<br>· LIN GROUND FAULT<br>· TEMPERATURE PROTECTION<br>· OVERCURRENT PROTECTION |
| 25% | ABNORMALLY DECREASE RELATIVE TO SET VOLTAGE | · VOLTAGE ABNORMALLY DECREASE |
| 50% | NORMAL OPERATION | — |
| 75% | CONSTANT VOLTAGE APPLICATION | · LIN DISCONNECTION |
| 100% | ABNORMALLY INCREASE RELATIVE TO SET VOLTAGE | · OVERVOLTAGE PROTECTION<br>· VOLTAGE ABNORMALLY INCREASE |

LOAD CONTROL APPARATUS AND METHOD FOR PROCESSING DIAGNOSIS SIGNAL FOR THE SAME

CROSS REFERENCE TO RELATED APPLICATIONS

This application is based on and incorporates herein by reference Japanese Patent Applications No. 2007-129291 filed on May 15, 2007 and No. 2007-327316 filed on Dec. 19, 2007.

FIELD OF THE INVENTION

The present invention relates to a load control apparatus configured to output a pulse width modulation signal (PWM signal). The present invention further relates to a method for processing a diagnosis signal for the load control apparatus.

BACKGROUND OF THE INVENTION

Conventionally, a fuel pump control device as a load control apparatus is provided in a vehicle and configured to output a diagnostic signal to the exterior of the fuel pump control device. For example, such a fuel pump control device is configured to output the diagnostic signal, which indicates high level in a state of normally operating and low level in a state where malfunction occur. In such a conventional structure provided with such a fuel pump control device, an engine electronic control unit (engine ECU) may be provided to receive such a diagnostic signal. In this case, the engine ECU may be capable of detecting occurrence of malfunction in the fuel pump control device based on the diagnostic signal. However, the engine ECU may not be capable of recognizing an operating state of the fuel pump control device based on the diagnostic signal.

JP-A-11-263240 discloses an example of performing malfunction diagnosis for an apparatus, which is provided for controlling a motor in a vehicle. In such a structure, the fuel pump control apparatus may be mounted on a flange of a fuel pump module inside a vehicle. In this case, it is difficult to make contact a probe directly with the control apparatus from the exterior of the vehicle in order to perform a malfunction diagnosis, unless a service hole or the like is provided in the vehicle body. Therefore, in general, a diagnostic signal is outputted to and monitored by an engine ECU or the like. Conventionally, it is hard to detect an operating state of the motor for a pump, without monitoring a diagnostic signal. Here, when the number of signal wires for outputting signals increases according to increase in the number of the monitored objects, another problem may occur. In JP-A-11-263240, an H-bridge inverter circuit is provided for manipulating a motor for a power steering. In this structure, voltage applied to the motor is determined based on a difference, which is obtained by A/D-converting each terminal voltage. The obtained voltage is compared with a drive instruction signal value, thereby various operating states are detected. However, in JP-A-11-263240, A/D conversion of each terminal voltage and a microcomputer for calculating the difference obtained by the A/D conversion are required. Accordingly, an operating state cannot be easily distinguished. The above problems may occur not only in a motor for a fuel pump, but also in other various loads in a structure having a constraint in arrangement.

SUMMARY OF THE INVENTION

In view of the foregoing and other problems, it is an object of the present invention to produce a load control apparatus, which is configured to perform a malfunction diagnosis and to detect an operating state of a load with a simple structure. It is another object of the present invention to produce a method for processing a diagnosis signal for the load control apparatus.

According to one aspect of the present invention, a load control apparatus configured to output a pulse width modulation signal to a switching element, which is connected between a power supply and a grand in series with a load, and configured to control the switching element according to an external drive instruction signal, the load control apparatus comprises abnormal increase detecting means for outputting an abnormal increase detection signal when detecting abnormal increase in applied voltage, which is applied to the load, relative to target voltage. The load control apparatus further comprises abnormal decrease detecting means for outputting an abnormal decrease detection signal when detecting abnormal decrease in the applied voltage relative to the target voltage. The load control apparatus further comprises operating state monitoring means for outputting a normally operating signal when the load normally operates. The load control apparatus further comprises signal combining means for generating a combined signal by combining the abnormal increase detection signal, the abnormal decrease detection signal, and the normally operating signal and outputting the combined signal via a common signal output terminal.

According to another aspect of the present invention, a method for processsing a diagnosis signal for a load control apparatus, which is configured to output a pulse width modulation signal to a switching element, which is connected between a power supply and a grand in series with a load, according to an eternal drive instruction signal to control the load, the method comprises generating an abnormal increase detection signal when detecting abnormal increase in applied voltage, which is applied to the load, relative to target voltage. The method further comprises generating an abnormal decrease detection signal when detecting abnormal decrease in the applied voltage relative to the target voltage. The method further comprises generating a normally operating signal when the load normally operates. The method further comprises generating a combined signal by combining the abnormal increase detection signal, the abnormal decrease detection signal, and the normally operating signal. The method further comprises outputting the combined signal via a common signal output terminal.

BRIEF DESCRIPTION OF THE DRAWINGS

The above and other objects, features and advantages of the present invention will become more apparent from the following detailed description made with reference to the accompanying drawings. In the drawings:

FIG. 7 is a table showing diagnostic signals.

DETAILED DESCRIPTION OF PREFERRED EMBODIMENTS

First Embodiment

Figure 1:
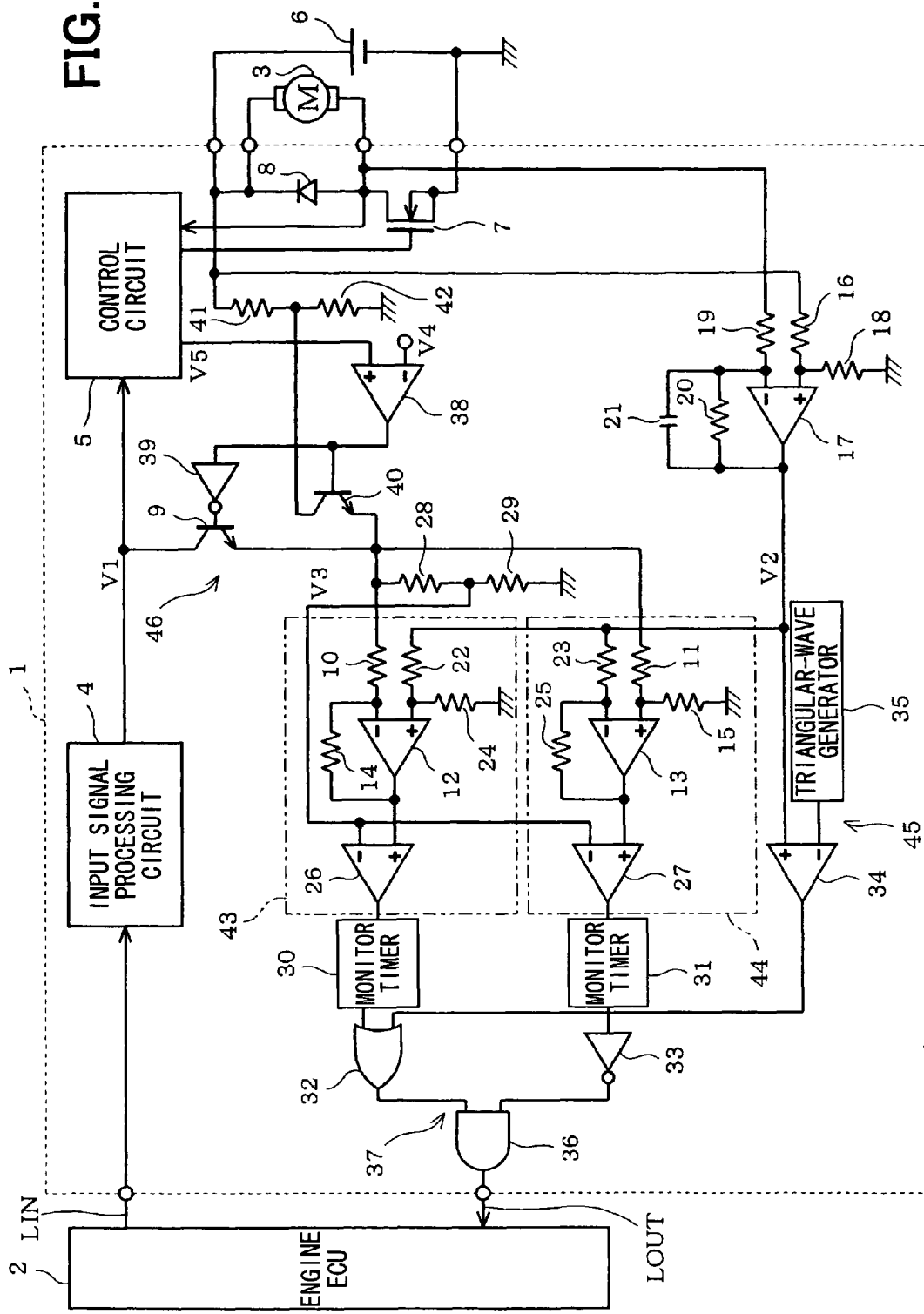
FIG. 1 is a schematic view showing a structure of a circuit including a load control apparatus according to a first embodiment.

As follows, the present embodiment is described with reference to FIGS. 1 to 3. As shown in FIG. 1, a fuel pump control device 1 as a load control apparatus outputs a pulse width modulation signal (PWM signal) to a DC motor 3 as a load in accordance with a drive instruction signal provided via a signal wire LIN from an electronic control unit (engine ECU) 2, thereby causing the DC motor 3 to control a fuel pump. The engine ECU 2 outputs a low-speed PWM signal, which is relatively low in speed, as the drive instruction signal (input duty), for example. An input signal processing circuit 4 of the fuel pump control device 1 integrates the low-speed PWM signal to convert the low-speed PWM signal into a level signal V1, thereby outputting the level signal V1 to a control circuit 5.

A series circuit, which includes the motor 3 and an N-channel MOSFET 7 as a switching element, is connected between the positive terminal of a battery 6 of a vehicle and the ground. A diode 8 is connected between both terminals of the motor 3 in an opposite direction. The control circuit 5 is configured to monitor the voltage of the negative terminal of the motor 3, which corresponds to a drain voltage of the FET 7, and to generate a PWM signal according to the drive instruction signal V1, thereby outputting the PWM signal as a gate signal of the FET 7.

A collector of an NPN transistor 9 is connected to an output line for the drive instruction signal V1. An emitter of the NPN transistor 9 is connected to the inverting input terminal of an operational amplifier 12 and both the noninverting input terminal of an operational amplifier 13 respectively via resistive elements 10, 11. A resistive element 14 is connected between the inverting input terminal of the operational amplifier 12 and the output terminal of the operational amplifier 12. A resistive element 15 is connected between the noninverting input terminal of the operational amplifier 13 and the ground.

The positive terminal of the battery 6 is connected to the noninverting input terminal of an operational amplifier 17 via a resistive element 16. A resistive element 18 is connected between the noninverting input terminal of the operational amplifier 17 and the ground. The negative terminal of the motor 3 is connected to the inverting input terminal of the operational amplifier 17 via a resistive element 19. A parallel circuit including a resistive element 20 and a capacitor 21 is connected between the inverting input terminal of the operational amplifier 17 and the output terminal of the operational amplifier 17. In the present structure, the circuit centering on the operational amplifier 17 is configured to perform amplification and smoothing of the voltage between the positive and negative terminals of the motor 3 and to output the amplified and smoothed voltage signal V2. The output voltage signal V2 is provided to the noninverting input terminal of the operational amplifier 12 and the inverting input terminal of the operational amplifier 13 respectively via resistive elements 22, 23.

A resistive element 24 is connected between the noninverting input terminal of the operational amplifier 12 and the ground. A resistive element 25 is connected between the inverting input terminal of the operational amplifier 13 and the output terminal of operational amplifier 13. In the present structure, the operational amplifier 12 is configured to perform differential amplification by converting a differential signal between an applied voltage signal V2 of the motor 3 and the drive instruction signal V1 provided via the transistor 9. Conversely, the operational amplifier 13 is configured to perform differential amplification by converting a differential signal between the drive instruction signal V1 and the applied voltage signal V2. The output terminals of the operational amplifiers 12, 13 are respectively connected to the noninverting input terminals of comparators 26, 27.

A series circuit including resistive elements 28, 29 is connected between the emitter of the transistor 9 and the ground. A common connecting point between the resistive elements 28, 29 is connected to the inverting input terminals of the comparators 26, 27. In the present structure, the comparators 26, 27 respectively compare the differential amplification output signals of the operational amplifiers 12, 13 with the divided voltage potential at the common connecting point between the resistive elements 28, 29 with respect to the drive instruction signal V1 as a reference. Alternatively, the comparators 26, 27 may respectively compare the differential amplification output signals of the operational amplifiers 12, 13 with optimal fixed voltage, which is divided voltage potential at low voltage for detecting malfunction. Whereby the comparators 26, 27 respectively output the comparison results to the input terminal of an OR gate 32 and the input terminal of a NOT gate 33 via monitor timers 30, 31.

The applied-voltage signal V2 is also provided to the noninverting input terminal of a comparator 34. The inverting input terminal of the comparator 34 is provided with a triangular-wave signal, which is generated by a triangular-wave generator 35. In the present structure, the comparator 34 generates the PWM signal, which indicates a duty according to a level of the applied-voltage signal V2, by comparing the applied-voltage signal V2 with the triangular-wave signal. Whereby, the comparator 34 outputs the PWM signal as a duty signal to another input terminal of the OR gate 32.

The output terminals of the OR gate 32 and the NOT gate 33 are respectively connected to the input terminals of an AND gate 36. The output terminal of the AND gate 36 is connected to the input terminal of the engine ECU 2 via a signal wire LOUT. The OR gate 32, the NOT gate 33, and the AND gate 36 configure a signal combining circuit 37 as a signal combining means.

The control circuit 5 generates the duty instruction signal by a feedback control processing, thereby outputting the duty instruction signal as a PWM signal V5 to the noninverting input terminal of a comparator 38 and the gate of the FET 7. The inverting input terminal of the comparator 38 is provided with a level signal V4, which corresponds to 100% of the duty instruction signal. The output terminal of the comparator 38 is connected to the base of the transistor 9 via a NOT gate 39. The output terminal of the comparator 38 is also connected to the base of an NPN transistor 40. A series circuit including resistive elements 41, 42 is connected between the positive terminal of the battery 6 and the ground. The common connecting point between the resistive elements 41, 42 is connected to the collector of the transistor 40. The emitter of the transistor 40 is connected to the emitter of the transistor 9.

In the above structure, the differential amplifier and the comparator 26 centering on the operational amplifier 12 configure a ground-fault detecting circuit 43. The differential amplifier and the comparator 27 centering on the operational amplifier 13 configure a power-source-fault detecting circuit 44. The ground-fault detecting circuit 43 may correspond to an abnormal increase detecting means. The power-source-fault detecting circuit 44 may correspond to an abnormal decrease detecting means. The comparator 34 and the triangular-wave generator 35 configure an operating state monitoring circuit 45. The control circuit 5, the transistors 9, 40, the comparator 38, the NOT gate 39, and the resistive elements 41, 42 configure a reference voltage converting circuit 46. The operating state monitoring circuit 45 may correspond to an operating state monitoring means. The reference voltage converting circuit 46 may correspond to a reference voltage converting means.

Figure 2:
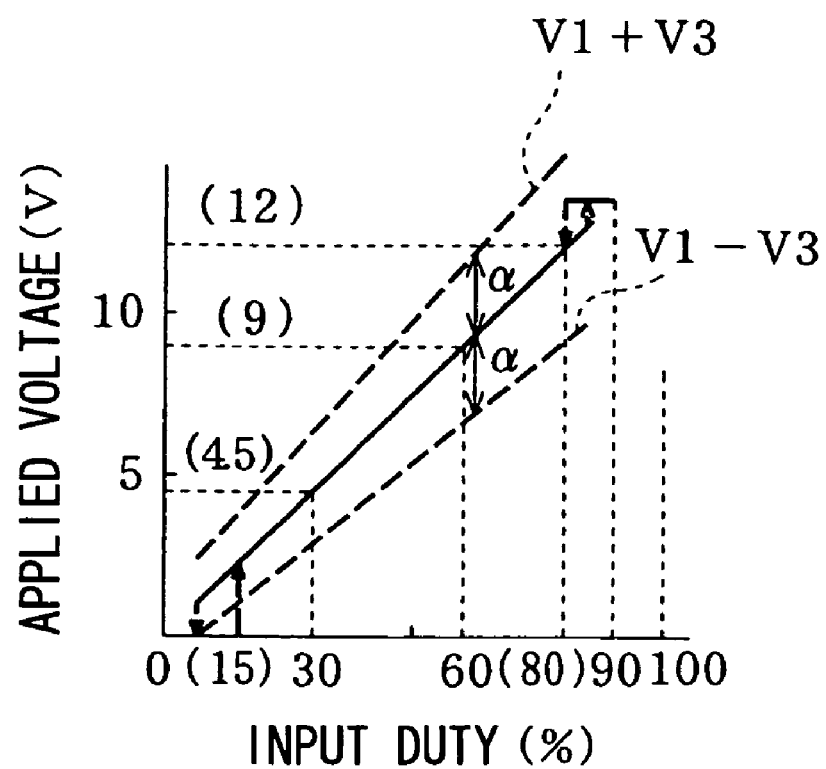
FIG. 2 is a graph showing a relationship between an applied voltage of a motor and a duty ratio of a drive instruction signal provided from an engine ECU.

FIG. 2 shows a relationship between the applied voltage V2 of the motor 3 (FP: fuel pump) and the duty ratio V1 of the drive instruction signal provided to the fuel pump control device 1 (FPC) from the engine ECU 2. FIG. 2 also shows a detection threshold for the ground-fault detecting circuit 43 and the power-source-fault detecting circuit 44. The output level of the comparator 26 becomes high when the following equation (1) is satisfied.

$$V2-V1>V3(V2>V1+V3) \quad (1)$$

The output level of the comparator 27 becomes high when the following equation (2) is satisfied.

$$V1-V2>V3(V2>V1-V3) \quad (2)$$

Namely, when the applied voltage V2 of the motor 3 becomes higher than the drive instruction signal voltage V1 by a reference voltage V3, the ground-fault detecting circuit 43 detects a ground-fault state. When the applied voltage V2 becomes lower than the drive instruction signal voltage V1 by the reference voltage V3, the power-source-fault detecting circuit 43 detects a power-source-fault state. In the ground-fault state, the circuit occurs a short circuit with respect to the ground, for example. In the power-source-fault state, the circuit causes a short circuit with respect to the positive terminal of the battery 6, for example. The reference voltage V3 is proportional with a value α.

As follows, an operation of the present embodiment is described with reference to FIG. 3. As shown in FIG. 3, the duty of the drive instruction signal changes from 70%, 50%, and 70%, as indicated by (a) in a state where the motor 3 normally operates. In this condition, the voltage V1, V2, V3 also change as respectively indicated by (b), (c), and (d) in FIG. 3, accompanying with the change in the duty of the drive instruction signal. The actual terminal voltage (applied voltage) of the motor 3 is indicated by (j) in FIG. 3. In the present condition, the voltage of the battery is presumed to be sufficient. In the present condition, the output signal of the comparator 38 is low level, whereby the transistor 9 is turned on, and the transistor 40 is turn off. Thus, the reference voltage 3 is set up based on the voltage V1. At the present time, the following equation (3) is satisfied.

$$V1-V3 \leq V2 \leq V1+V3 \quad (3)$$

Therefore, the output signal of each of the comparators 26, 27 are low level. Thus, as indicated by (k) in FIG. 3, the AND gate 36 outputs the output signal of the comparator 34 as it is. That is, the AND gate 36 outputs the duty signal as a normal operating signal corresponding to the voltage V2, which is equivalent to the applied voltage of the motor 3.

Figure 3:
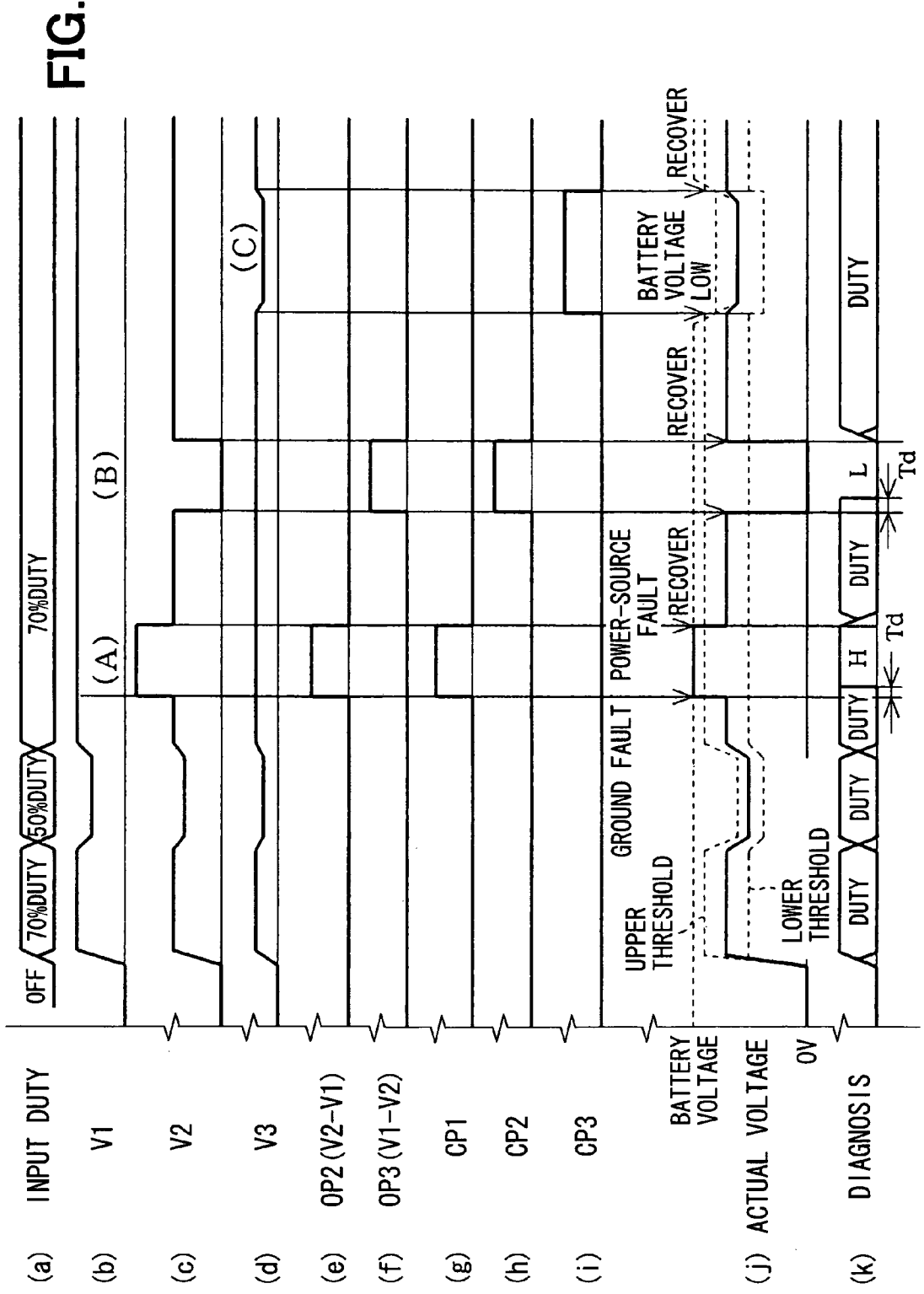
FIG. 3 is a timing chart showing transition of signals accompanying change in the drive instruction signal.

As shown in FIG. 3, when the negative terminal of the motor 3 causes a ground fault at the time point (A), as indicated by (j) and (c) in FIG. 3, the applied voltage V2 of the motor 3 increases to be higher than a level corresponding to the drive instruction signal voltage V1. In this condition, when the above equation (1) is satisfied, as indicated by (g), the output signal of the comparator 26 becomes high level. Therefore, as indicated by (k) in FIG. 3, the output signal of the AND gate 36 maintains being high level. At this time, as indicated by (k) in FIG. 3, change in the state of the output signal of the AND gate 36 as a diagnostic signal delays by the time delay Td, which is produced by the monitor timer 30. Here, the time delay Td is provided, thereby the state where the normal operating signal is outputted is steadily changed to a state where a ground-fault detection signal is outputted.

As shown in FIG. 3, when the negative terminal of the motor 3 causes a power-source fault, as indicated by (j) and (c) in FIG. 3 at the time point (B), the applied voltage V2 of the motor 3 decreases to be lower than a level corresponding to the drive instruction signal voltage V1. In this condition, when the above equation (2) is satisfied, as indicated by (h), the output signal of the comparator 27 becomes high level. Therefore, as indicated by (k) in FIG. 3, the output signal of the AND gate 36 maintains being at the low level. At this time, as indicated by (k) in FIG. 3, the timing, at which the state of the output signal of the AND gate 36 as the diagnostic signal changes to indicate the ground-fault detection signal, also delays by the time delay Td, which is produced by the monitor timer 31.

Furthermore, when the battery voltage is lower than the drive instruction signal voltage, or when the duty of the drive instruction signal is at 100%, the output voltage depends on the battery voltage. In this case, the actual output voltage may become low with respect to the drive instruction signal. Consequently, it may be erroneously determined that malfunction occurs and the decrease in the actual output voltage results from the malfunction.

Therefore, in the present embodiment, at the time point (C) in FIG. 3, as indicated by (j), in a case where the voltage of the battery 6 decreases, the duty instruction signal V5, which is obtained by the feedback control processing and outputted from the control circuit 5, increases. In this case, the duty instruction signal V5 becomes greater than the level signal V4, which corresponds to 100% of the duty instruction signal, to satisfy V5>V4. Thus, as indicated by (i) in FIG. 3, the output signal level of the comparator 38 changes from the low level to the high level. Thus, the transistor 9 is turned OFF and the transistor 40 is turned ON. The reference voltage V3, which is previously set based on the drive instruction signal voltage V1, is then set based on the voltage of the battery 6. Consequently, the reference voltage V3 decreases, and the output signal of the comparator 27 of the power-source-fault detecting circuit 44 does not become high level. Therefore, the comparator 27 outputs the duty signal at less than 100% thereof as a normally operating signal.

According to the present embodiment, the fuel pump control device 1 includes the ground-fault detecting circuit 43 and power-source-fault detecting circuit 44. The ground-fault detecting circuit 43 outputs a ground-fault detection signal when detecting a ground fault state as an output voltage abnormally increasing state (abnormal increase) in the common connecting point (drain) between the motor 3 and the FET 7. The power-source-fault detecting circuit 44 outputs a power-source-fault detection signal when detecting a power-source fault state as an output voltage abnormally decreasing state (abnormal decrease) in the common connecting point between the motor 3 and the FET 7. The operating state monitoring circuit 45 outputs the normal operating signal of the motor 3. The signal combining circuit 37 is configured to combine the ground-fault detection signal, the power-source-fault detection signal, and the normal operating signal and to output the signals via a common signal output terminal. Therefore, the engine ECU 2 is capable of detecting the ground-fault state, the power-source-fault state, and a normal operation of the motor 3 for the fuel pump by monitoring the state of the signal output terminal.

The signal combining circuit 37 is configured to output the normal operating signal in a period, in which the ground-fault detecting circuit 43 and the power-source-fault detecting circuit 44 do not respectively output the ground-fault detection signal and the power-source-fault detection signal. Therefore, the normal operation of the motor 3 can be detected when both the ground fault and the power-source fault do not occur.

The ground-fault detecting circuit 43 detects the ground-fault state when the difference between the voltage V2, which is equivalent to the terminal voltage of the motor 3, and the drive instruction signal V1 becomes greater than the reference voltage V3 as a threshold voltage. That is, the ground-fault detecting circuit 43 detects the ground-fault state when a value calculated by subtracting the drive instruction signal V1 from the voltage V2 becomes greater than the reference voltage V3. The power-source-fault detecting circuit 44 detects the power-source-fault state when the difference between the voltage V1 and the voltage V2 becomes greater than the reference voltage V3 as the threshold voltage. That is, the power-source-fault detecting circuit 44 detects the power-source-fault state when a value calculated by subtracting the voltage V2 from the voltage V1 becomes greater than the reference voltage V3. Therefore, detection of the ground fault and the power-source fault can be easily performed.

The operating state monitoring circuit 45 is configured to output the normal operating signal, which is reflected with the terminal voltage of the motor 3. Therefore, in a period, in which the motor 3 normally operates, the terminal voltage of the motor 3 can be monitored by referring to the normal operating signal. Specifically, the operating state monitoring circuit 45 generates the duty signal based on the voltage V2, which is the level signal obtained by smoothing the PWM voltage, which is applied to the motor 3. The operating state monitoring circuit 45 then outputs the generated duty signal as the normally operating signal. In the present structure, the detecting circuits 43, 44 are capable of easy comparing the voltage signals. In the present structure, the motor 3 is determined to be normally operating in the period, in which the operating state monitoring circuit 45 outputs the duty signal. Furthermore, it can be determined whether the motor 3 is actually applied with the voltage according to the drive instruction signal, in accordance with the magnitude of the duty.

In addition, in the present embodiment, the ground-fault detection signal and the power-source-fault detection signal respectively indicate the high level and the low level, which are different from each other in level. The reference voltage converting circuit 46 compares the instruction level V5 of the PWM signal, which the control circuit 5 outputs, with the instruction level V4, which corresponds to the duty of the PWM signal at 100%. The reference voltage converting circuit 46 replaces the drive instruction signal, to which the detecting circuits 43, 44 refer, to the reference voltage, which is based on the terminal voltage of the battery 6, when detecting that the instruction level V5 becomes greater than the instruction level V4. Also in the present case, the ground-fault detection and the power-source-fault detection can be appropriately performed.

Second Embodiment

Figure 4:
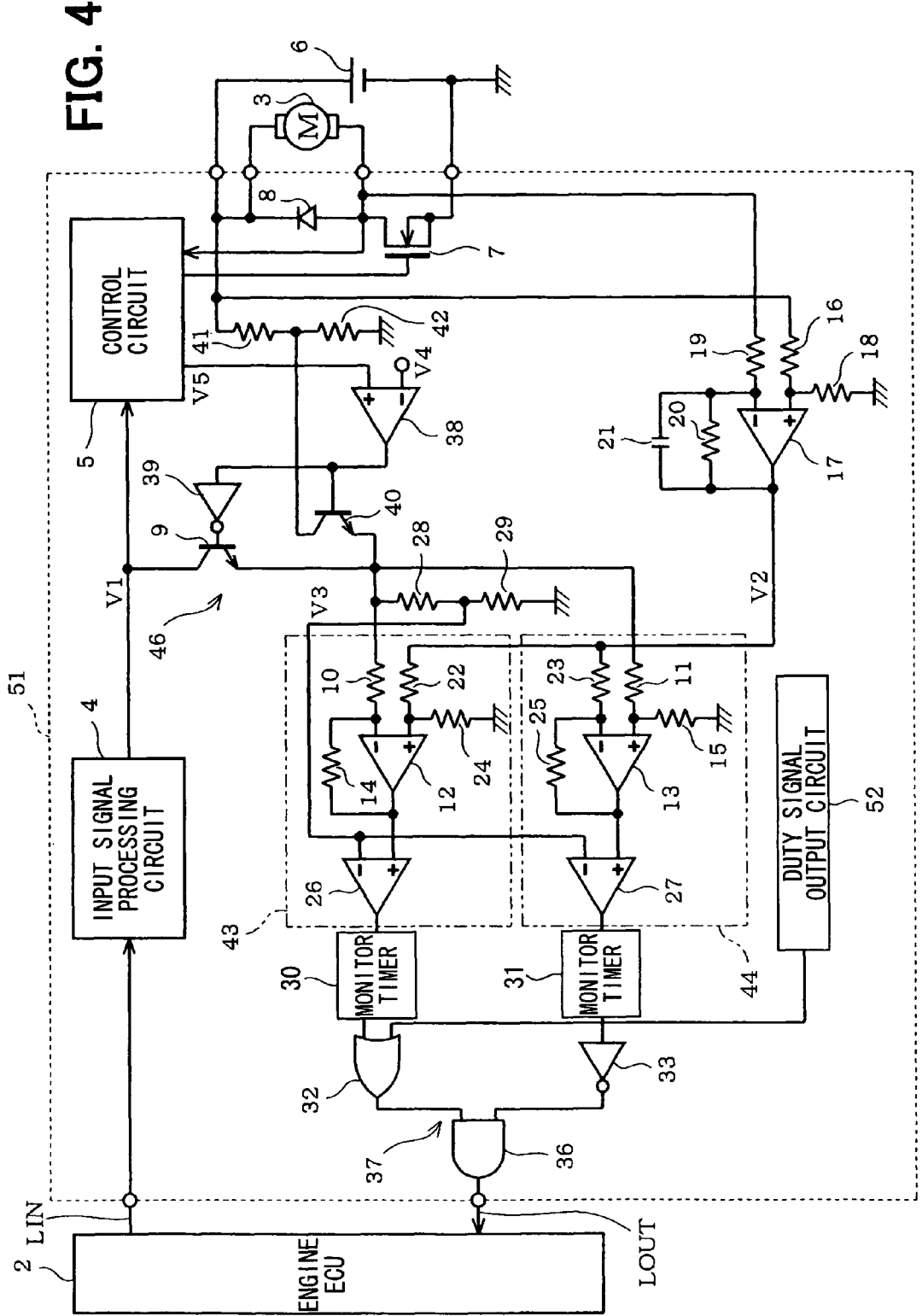
FIG. 4 is a schematic view showing a structure of a circuit including a load control apparatus according to a second embodiment.

As shown in FIG. 4, in the second embodiment, a fuel pump control device 51 includes a duty signal output circuit 52 as an operating state monitoring means, which is replaced from the operating state monitoring circuit 45 of the control device 1 in the first embodiment. The duty signal output circuit 52 is configured to regularly output a constant signal of a fixed duty, which is fixed at 50%, for example.

As described above, in the first embodiment, the signal, which indicates the duty corresponding to the applied voltage of the motor 3 is outputted as a normally operating signal. By contrast, in the present second embodiment, when the ground fault and/or the power-source fault do not occur, a signal of duty at 50% is outputted irrespective to the applied voltage of the motor 3. Therefore, the engine ECU 2 is capable of determining the motor 3 to be normally operating when detecting the duty signal.

According to the present second embodiment, the duty signal output circuit 52 is configured to generating the pulse signal, which has the fixed duty ratio, and to output the pulse signal as the normally operating signal. Therefore, the ground-fault detection signal, the power-source-fault detection signal, and the normally operating signal can be easily distinguished based on the three output forms.

Third Embodiment

Figure 5:
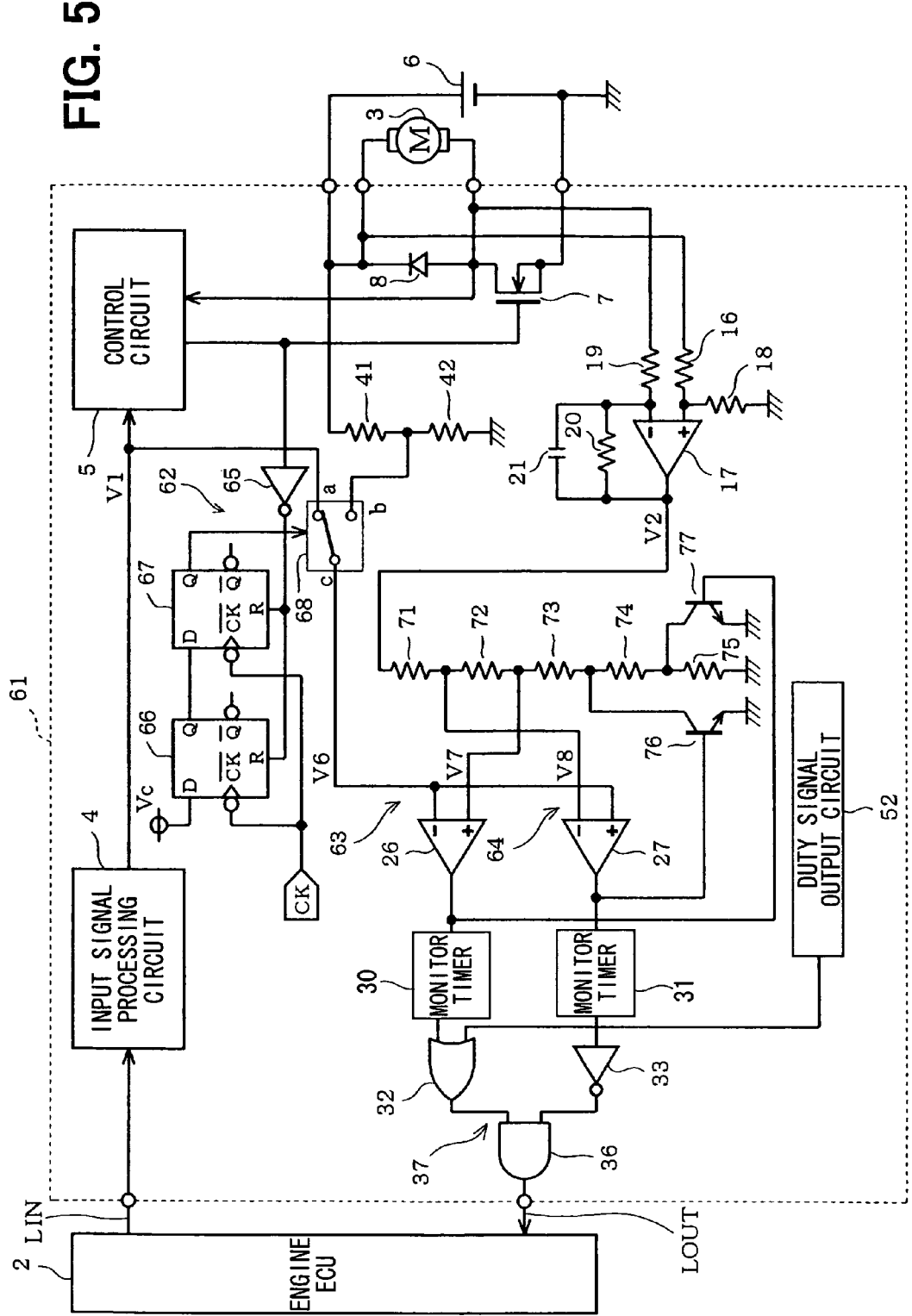
FIG. 5 is a schematic view showing a structure of a circuit including a load control apparatus according to a third embodiment.

As shown in FIG. 5, in the present third embodiment, a fuel pump control device 61 as a load control apparatus includes a reference voltage converting circuit 62, a ground-fault detecting circuit 63, and a power-source-fault detecting circuit 64. The reference voltage converting circuit 46 in the second embodiment is replaced to the reference voltage converting circuit 62 as a reference voltage converting means in the present embodiment. Further, both, the ground-fault detecting circuit 43 and the power-source-fault detecting circuit 44 in the second embodiment are replaced to the ground-fault detecting circuit 63 as an abnormal increase detecting means and the power-source-fault detecting circuit 64 as an abnormal decrease detecting means in the present embodiment.

A reference voltage converting circuit 62 includes a NOT gate 65, D flip-flops 66, 67, and a changeover switch 68. The D flip-flops 66, 67 are connected in series. The data input terminal D of the first-stage D flip-flop 66 is connected to a power supply voltage terminal and pulled up to the power supply level Vc. The dock terminal CK as the negative logic input of the first-stage D flip-flop 66 is provided with a common dock signal CK. The data output terminal Q of the latter-stage D flip-flop 67 is configured to provide a switch control signal to the changeover switch 68.

The input terminal of the NOT gate 65 is provided with a gate signal of the FET 7. The gate signal of the FET 7 is outputted from the control circuit 5. The output terminal of the NOT gate 65 is connected to the reset terminals R of both the D flip-flops 66, 67. The fixed contact a of the changeover switch 68 is provided with the level signal V1. The fixed contact b of the changeover switch 68 is connected to a common connecting point between the resistive elements 41, 42. The traveling contact c of the changeover switch 68 is at a level V6 and connected with both the inverting input terminal of the comparator 26 and the noninverting input terminal of the comparator 27.

The differential amplifiers, which are provided among the output terminal of the operational amplifier 17 and the comparators 26, 27 in the first and second embodiments, are omitted from the ground-fault detecting circuit 63 and the power-source-fault detecting circuit 64. Instead of the differential amplifiers in the first and second embodiments, a series circuit, which includes multiple resistive elements 71 to 75, is connected between the output terminal of the operational amplifier 17 and the grand in the present embodiment. A common connecting point between the resistive elements 71, 72 at a level V8 is connected to the inverting input terminal of the comparator 27. A common connecting point between the resistive elements 72, 73 at a level V7 is connected to the noninverting input terminal of the comparator 26.

An NPN transistor 76 is connected in parallel with a series circuit, which includes the resistive elements 74, 75. An NPN transistor 77 is connected in parallel with the resistive element 75. The base terminals of the transistors 76, 77 are respectively connected to the output terminals of the comparators 27, 26. In the present structure, the ground-fault detecting circuit 63 and the power-source-fault detecting circuit 64 commonly have the series circuit, which includes the resistive elements 71 to 75, and the transistors 76, 77.

The amplification factor of the differential amplifier configured centering on the operational amplifier 17 and the resistance of each of the resistive elements 71 to 75 are predetermined. Specifically, in the ground-fault detecting circuit 63, the voltage V7 provided to the noninverting input terminal of the comparator 26 satisfies the following relation of V6/V7=(V2+α)/V2. In addition, in the power-source-fault detecting circuit 64, the voltage V8 provided to the inverting input terminal of the comparator 27 satisfies the following relation of V6/V8=(V2−α)/V2.

The transistors 76, 77 are configured to provide a hysteresis to each of the output characteristics of the comparators 26, 27. Specifically, the transistors 76, 77 are turned on when the output signals of the comparators 26, 27 become high level, thereby short-circuiting, i.e., bypassing the resistive element 75 or both the resistive elements 74, 75 to decrease the threshold voltage.

As follows, the reference voltage converting circuit 62 is described. The traveling contact c of the changeover switch 68 is configured to be set at the fixed contact a, when the control signal is low level, and to be set at the fixed contact b when the control signal is high level. When the PWM duty of the gate signal of the FET 7 is less than 100%, which is at a full-on state, the D flip-flops 66, 67 are reset every time when the gate signal is set at low level. Therefore, the traveling contact c of the changeover switch 68 maintains being set at the fixed contact a at the voltage V1.

When the PWM duty becomes 100% and at the full-on state, the D flip-flops 66, 67 are no longer reset. In the present condition, the traveling contact c of the changeover switch 68 is switched to the fixed contact b, which is at a level corresponding to the voltage of the battery 6. It suffices that the dock signal CK is provided to the D flip-flops 66, 67 at a cycle less than or equal to the switching cycle of the PWM control.

The structure according to the present third embodiment as described above is capable of producing substantially the same function as those of the first and second embodiments. In particular, according to the present third embodiment, the ground-fault detecting circuit 63 and the power-source-fault detecting circuit 64 have a common portion, which is shared therebetween. Therefore, a circuit scale can be reduced in the present embodiment.

Fourth Embodiment

Figure 6:
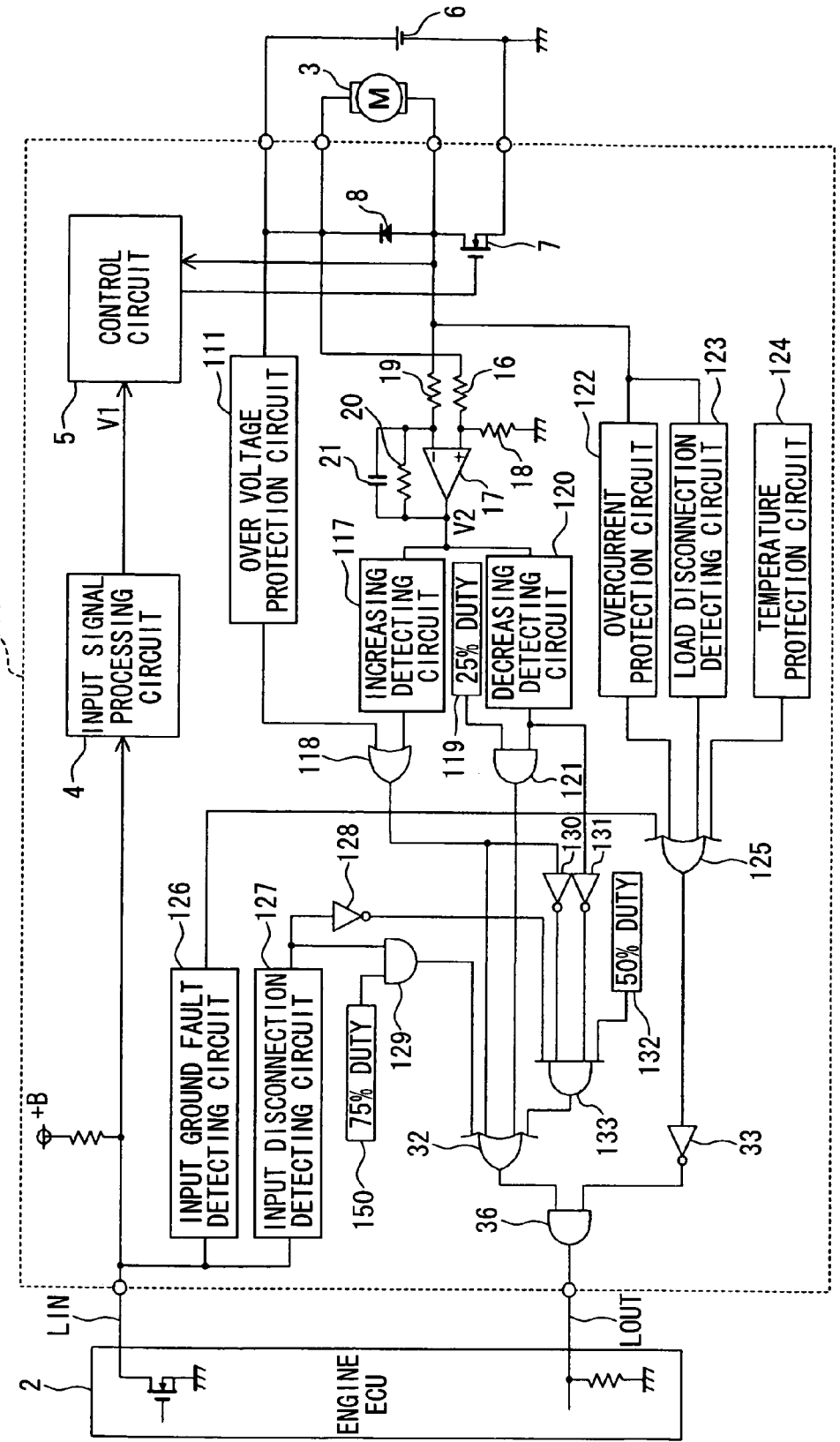
FIG. 6 is a schematic view showing a structure of a circuit including a load control apparatus according to a fourth embodiment.

The fourth embodiment is described with reference to FIGS. 6, 7. The fuel pump control device 71 according to the present fourth embodiment includes an output voltage abnormally increasing detecting circuit 117, an output voltage abnormally decreasing detecting circuit 120, protection circuits 111, 124, 122, and a malfunction detection circuit 127, 126. The fuel pump control device 71 selectively outputs diagnostic signals in accordance with the defect mode obtained by the detecting circuits and protection circuits.

An input signal line ground fault detecting circuit (input ground fault detecting circuit) 126 and an input signal line disconnection detecting circuit (input disconnection detecting circuit) 127 are connected to the signal wire LIN connected from the engine ECU 2. The input ground fault detecting circuit 126 outputs the H level by turning the output voltage OFF when detecting ground fault caused in the input signal line LIN. The input disconnection detecting circuit 127 outputs the H level when detecting disconnection caused in the input signal line LIN. The output terminal of the input disconnection detecting circuit 127 is connected to the input terminal of an AND gate 129. In the present structure, when the input disconnection detecting circuit 127 detects disconnection of the input signal line LIN, a 75% DUTY generating circuit 150 outputs a 75% DUTY signal through the AND gate 129. The output terminal of the input disconnection detecting circuit 127 is further connected to the input terminal of a NOT gate 128.

The positive terminal of the battery 6 of the vehicle is connected with an overvoltage protection circuit 111. The overvoltage protection circuit 111 outputs the battery voltage as the output voltage when detecting overvoltage.

The circuit centering on the operational amplifier 17 is configured to perform amplification and smoothing of the voltage between the positive and negative terminals of the pump 3 and to output the amplified and smoothed voltage signal V2, similarly to the first embodiment. The circuit centering on the operational amplifier 17 outputs the voltage signal V2 to the output voltage abnormally increasing detecting circuit 117. The overvoltage protection circuit 111 and the output voltage abnormally increasing detecting circuit 117 output the H level signal, which is equivalent to a 100% DUTY signal through the output terminal of an OR gate 118, when respectively detecting the overvoltage and the output voltage abnormally increasing. The output terminal of the OR gate 118 is connected to the input terminals of the OR gate 32 and a NOT gate 130. The output signal V2 of the circuit centering on the operational amplifier 17 is further output to the output voltage abnormally decreasing detecting circuit 120. The output voltage abnormally decreasing detecting circuit 120 outputs the H level when detecting the output voltage abnormally decreasing. The output terminal of the output voltage abnormally decreasing detecting circuit 120 is connected to the input terminal of an AND gate 121. In the present structure, a 25% DUTY generating circuit 119 outputs a 25% DUTY signal through the output terminal of the AND gate 121 when the output voltage abnormally decreasing detecting circuit 120 detects the output voltage abnormally decreasing. The output terminal of the output voltage abnormally decreasing detecting circuit 120 is connected to the input terminal of a NOT gate 131. The output terminals of the NOT gates 128, 130, 131 and the output terminal of a 50% DUTY generating circuit 132 are connected to an AND gate 133. In the present structure, the 50% DUTY generating circuit 132 outputs a 50% DUTY signal through the AND gate 133 when all the input signals of the NOT gates 128, 130, 131 are at L level.

The negative terminal of the pump 3 as the load is connected with an overcurrent protection circuit 122 and a load disconnection detecting circuit 123. The pump 3 includes a temperature protection circuit 124. The overcurrent protection circuit 122 outputs the H level when detecting the overcurrent. The load disconnection detecting circuit 123 outputs the H level when detecting the disconnection caused in a wire of the pump 3 as the load. The temperature protection circuit 124 outputs the H level when detecting malfunction of temperature caused in the pump 3. The output terminals of the overcurrent protection circuit 122, the load disconnection detecting circuit 123, the temperature protection circuit 124, and the input ground fault detecting circuit 126 are connected to an OR gate 125. The output terminal of the OR gate 125 is connected to the NOT gate 33.

Next, the operation of both the protection circuits and malfunction detecting circuits and switching of the diagnostic signal LOUT are described with reference to FIGS. 6, 7. As shown in FIG. 7, the diagnostic signal LOUT is selectively switched in accordance with the state of the load.

1) DUTY 0%

When one of the overcurrent protection circuit 122, the load disconnection detecting circuit 123, the temperature protection circuit 124, and the input ground fault detecting circuit 126 detects malfunction, the signal at H level is outputted to the NOT gate 33 through the OR gate 125. The overcurrent protection circuit 122, the load disconnection detecting circuit 123, and the temperature protection circuit 124 are connected to the negative terminal of the pump 3 as the load. The input ground fault detecting circuit 126 is connected to the signal wire LIN of the engine ECU 2. In this case, the signal at the H level from the OR gate 125 is inverted to the L level by the NOT gate 33 and outputted to the AND gate 36. Consequently, in the present condition, the output signal of the AND gate 36 is at the L level. That is, the output signal of the AND gate 36 is equivalent to a 0% DUTY signal. Therefore, the engine ECU 2 detects an output-OFF state or an irregular-stop state of the pump 3 as the state of the pump 3. Thus, the engine ECU 2 detects occurrence of one of the over-current protection, the disconnection caused in a power line of the load, the temperature protection, and the ground fault in the input signal line.

2) DUTY 25%

The output voltage abnormally decreasing detecting circuit 120 outputs the H level when detecting the output voltage abnormally decreasing. The output terminal of the output voltage abnormally decreasing detecting circuit 120 is connected to the input terminal of the AND gate 121. In the present structure, the 25% DUTY generating circuit 119 outputs the 25% DUTY signal through the output terminal of the AND gate 121 when the output voltage abnormally decreasing detecting circuit 120 detects the output voltage abnormally decreasing. The 25% DUTY signal is outputted to the AND gate 36 through the OR gate 32. In the present condition, when the output signal of the NOT gate 33 is at the H level since all the protection circuits 122, 123, 124 and the input ground fault detecting circuit (malfunction detecting circuit) 126 do not detect malfunction, the output signal of the AND gate 36 is the 25% DUTY signal. Thus, the engine ECU 2 detects the abnormally decrease in the output voltage relative to the set value of the output voltage, as the operating state of the pump 3. Thus, the engine ECU 2 detects the occurrence of the output voltage abnormally decreasing.

3) DUTY 75%

The input disconnection detecting circuit 127 outputs the H level when detecting disconnection caused in the input signal line LIN. The output terminal of the input disconnection detecting circuit 127 is connected to the input terminal of the AND gate 129. In the present structure, the 75% DUTY generating circuit 150 outputs the 75% DUTY signal through the output terminal of the AND gate 129 when the input disconnection detecting circuit 127 detects the disconnection caused in the input signal line LIN. The 75% DUTY signal is outputted to the AND gate 36 through the OR gate 32. In the present condition, when the output signal of the NOT gate 33 is at the H level since all the protection circuits 122, 123, 124 and the malfunction detecting circuit 126 do not detect malfunction, the output signal of the AND gate 36 is the 75% DUTY signal. Thus, the engine ECU 2 detects a constant voltage application state, as the operating state of the pump 3. Thus, the engine ECU 2 detects the occurrence of the disconnection caused in the input signal line LIN.

4) DUTY 100%

The overvoltage protection circuit 111 and the output voltage abnormally increasing detecting circuit 117 output the H level signal, which is equivalent to the 100% DUTY signal through the output terminal of the OR gate 118, when respectively detecting the overvoltage and the output voltage abnormally increasing. The H level signal from the output voltage abnormally increasing detecting circuit 117 is outputted to the AND gate 36 through the OR gate 32. In the present condition, when the output signal of the NOT gate 33 is at the H level since all the protection circuits 122, 123, 124 and the malfunction detecting circuit 126 do not detect malfunction, the output signal of the AND gate 36 is the 100% DUTY signal. Thus, the engine ECU 2 detects the abnormally increase in the output voltage relative to the set value of the output voltage, as the operating state of the pump 3. Thus, the engine ECU 2 detects the occurrence of the overvoltage protection or the output voltage abnormally increasing.

5) DUTY 50%

When the malfunctions are not detected, a 50% DUTY signal is outputted to the engine ECU2.

According to the present embodiment, the engine ECU2 is capable of obtaining the malfunction states in the operation of the load in detail, by assigning the detected malfunction states to multiple duty ratios as the diagnostic signal. Therefore, the engine ECU2 is capable of determining necessity of an evacuation running operation, whereby a defect portion can be easily identified. Thus, serviceability, i.e., maintainability can be enhanced.

In addition, since the diagnostic signal at the time of the normal operation is set at the 50% DUTY signal, the engine ECU2 is capable of detecting occurrence of malfunction, even when disconnection or ground fault is caused in the diagnostic signal line LOUT.

In the present embodiment, the diagnostic signal includes the 25, 50, 75, and 100% DUTY signals as examples. The duty ratio of the diagnostic signal may be arbitrary determined.

The structures and operations are not limited only to the embodiments and the drawings described above. The following modifications and/or extensions are also available and effective.

The switching element is not limited to the FET 7, and may be a bipolar transistor such as an insulated-gate bipolar transistor (IGBT).

It may apply to a high-side drive system, without limiting to the low-side drive system.

The reference voltage converting means may be arbitrary provided, as needed. For example, when the stability of the battery voltage is secured, and/or the maximum output voltage is regulated to be less than 100%, the reference voltage converting means need not be provided.

The monitor timers 30, 31 may be arbitrary provided, as needed.

The normally operating signal is not limited to be output as the duty signal. It suffices that the normally operating signal is distinguishable from the ground-fault detection signal and the power-source-fault detection signal in output mode.

The structure in the first embodiment and the structure in the third embodiment may be combined.

In the third embodiment, the resistive elements 71 to 75 may be configured with a variable resistor so as to variably set the detection threshold. In this case, for example, the detection threshold may be increased at the time of change in the output voltage, thereby erroneous detection, which is caused by response delay in the detecting circuit with respect to change in the output voltage, can be restricted.

In the third embodiment, the transistors 76, 77, which are for providing the hysteresis characteristic in the threshold of the comparators 26, 27, may be arbitrary provided as needed.

The load is not limited to the motor 3 for the fuel pump. The load may be a direct-current motor, such as an electric fan for a radiator or a motor for a blower. The load may be a solenoid actuator or a solenoid valve, and may be a resistance such as a heater for an airconditioner heater or a sheet, for example.

The above processings such as calculations and determinations are not limited being executed by the engine ECU 2. The control unit may have various structures including the engine ECU 2 shown as an example.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A load control apparatus configured to output a pulse width modulation signal to a switching element, which is connected between a power supply and ground in series with a load, and configured to control the switching element according to an external drive instruction signal, the load control apparatus comprising:
    means for outputting an abnormal increase detection signal when detecting abnormal increase in applied voltage, which is applied to the load, relative to target voltage;
    means for outputting an abnormal decrease detection signal when detecting abnormal decrease in the applied voltage relative to the target voltage;
    means for outputting a normally operating signal according to an output of the pulse width modulation signal when the load normally operates; and
    means for
    generating a combined signal by combining the abnormal increase detection signal received from the means for outputting an abnormal increase detection signal, the abnormal decrease detection signal received from the means for outputting an abnormal decrease detection signal, and the normally operating signal received from the means for outputting a normally operating signal such that the abnormal increase detection signal, the abnormal decrease detection signal, and the normally operating signal being distinguishable from each other, and
    outputting the combined signal via a common signal output terminal.

2. The load control apparatus according to claim 1,
    wherein the means for generating a combined signal is configured to output the normally operating signal in a condition except for at least one of conditions where:
    the means for outputting an abnormal increase detection signal outputs the abnormal increase detection signal; and
    the means for outputting an abnormal decrease detection signal outputs the abnormal decrease detection signal.

3. The load control apparatus according to claim 1,
    wherein the means for outputting an abnormal increase detection signal detects the abnormal increase when a value, which is calculated by subtracting the drive instruction signal from the applied voltage, becomes greater than a threshold, and
    the means for outputting an abnormal decrease detection signal detects the abnormal decrease when a value, which is calculated by subtracting the applied voltage from the drive instruction signal, becomes greater than a threshold.

4. The load control apparatus according to claim 3, wherein the means for outputting a normally operating signal is configured to output the normally operating signal, which reflects the applied voltage.

5. The load control apparatus according to claim 4,
    wherein the applied voltage is a level signal, which is obtained by smoothing voltage applied to the load,
    the means for outputting an abnormal increase detection signal and the means for outputting an abnormal decrease detection signal are configured to refer to the applied voltage as the level signal, and
    the means for outputting a normally operating signal is configured to generate a duty signal according to the applied voltage as the level signal and configured to output the duty signal as the normally operating signal.

6. The load control apparatus according to claim 3, wherein the means for outputting an abnormal increase detection signal and the means for outputting an abnormal decrease detection signal are configured to output the abnormal increase detection signal and the abnormal decrease detection signal indicating a high level and a low level, which are different in level.

7. The load control apparatus according to claim 6, wherein the means for outputting a normally operating signal is configured to generate a pulse signal, which has a constant duty ratio, and configured to output the pulse signal as the normally operating signal.

8. The load control apparatus according to claim 3,
    wherein the abnormal increase detection signal and the abnormal decrease detection signal indicate a high level and a low level,
    the load control apparatus further comprising:
    means for generating the pulse width modulation signal based on the drive instruction signal and the applied voltage and configured to output the pulse width modulation signal,
    wherein the means for outputting an abnormal increase detection signal and the means for outputting an abnormal decrease detection signal are configured to refer to a reference signal, which is one of the drive instruction signal and a reference voltage, which relates to a voltage of the power supply,
    the means for generating the pulse width modulation signal is configured to compare a signal-instruction level of the pulse width modulation signal with a 100%-instruction level, which corresponds to the pulse width modulation signal at substantially 100% duty, and
    the means for generating the pulse width modulation signal is configured to replace the reference signal from the drive instruction signal to the reference voltage when detecting that the signal-instruction level is greater than the 100%-instruction level.

9. The load control apparatus according to claim 1, wherein the means for generating a combined signal generates the combined signal by assigning a plurality of detected malfunction states respectively to a plurality of duty ratios.

10. The load control apparatus according to claim 9,
wherein the plurality of detected malfunction states includes the abnormal increase in the applied voltage, the abnormal decrease in the applied voltage, and at least one of the following states:
ground fault caused in a signal wire of a drive instruction signal provided from an exterior;
disconnection caused in the signal wire of the drive instruction signal provided from the exterior;
overvoltage protection caused in the load;
overcurrent protection caused in the load;
disconnection of a power line of the load; and
temperature protection of the load.

11. The load control apparatus according to claim 1, further comprising:
means for monitoring a state of the combined signal outputted from the common signal output terminal to detect the abnormal increase in applied voltage, the abnormal decrease in the applied voltage, and normal operation of the load,
wherein the abnormal increase detection signal indicates the abnormal increase in applied voltage, the abnormal decrease detection signal indicates the abnormal decrease in the applied voltage, and the normally operating signal indicates the normal operation of the load.

12. A method for processsing a diagnosis signal for a load control apparatus, which is configured to output a pulse width modulation signal to a switching element, which is connected between a power supply and ground in series with a load, according to an external drive instruction signal to control the load, the method comprising:
generating an abnormal increase detection signal when detecting an abnormal increase in applied voltage, which is applied to the load, relative to a target voltage;
generating an abnormal decrease detection signal when detecting an abnormal decrease in the applied voltage relative to the target voltage;
generating a normally operating signal according to an output of the pulse width modulation signal when the load normally operates;
generating a combined signal by combining the abnormal increase detection signal, the abnormal decrease detection signal, and the normally operating signal; and
outputting the combined signal via a common signal output terminal such that the abnormal increase detection signal, the abnormal decrease detection signal, and the normally operating signal are distinguishable from each other.

13. The load control apparatus according to claim 12, further comprising:
monitoring a state of the outputted combined signal to detect the abnormal increase in applied voltage, the abnormal decrease in the applied voltage, and normal operation of the load,
wherein the abnormal increase detection signal indicates the abnormal increase in applied voltage, the abnormal decrease detection signal indicates the abnormal decrease in the applied voltage, and the normally operating signal indicates the normal operation of the load.

14. A load control apparatus configured to output a pulse width modulation signal to a switching element, which is connected between a power supply and ground in series with a load, and configured to control the switching element according to an external drive instruction signal, the load control apparatus comprising:
means for outputting an abnormal increase detection signal when detecting an abnormal increase in applied voltage, which is applied to the load, relative to a target voltage;
means for outputting an abnormal decrease detection signal when detecting an abnormal decrease in the applied voltage relative to the target voltage;
means for outputting a normally operating signal according to an output of the pulse width modulation signal when the load normally operates;
means for generating a combined signal by combining the abnormal increase detection signal, the abnormal decrease detection signal, and the normally operating signal and outputting the combined signal via a common signal output terminal; and
means for generating the pulse width modulation signal based on the drive instruction signal and the applied voltage and configured to output the pulse width modulation signal,
wherein the means for outputting an abnormal increase detection signal detects the abnormal increase when a value, which is calculated by subtracting the drive instruction signal from the applied voltage, becomes greater than a threshold,
the means for outputting an abnormal decrease detection signal detects the abnormal decrease when a value, which is calculated by subtracting the applied voltage from the drive instruction signal, becomes greater than a threshold,
the abnormal increase detection signal and the abnormal decrease detection signal respectively indicate a high level and a low level,
the means for outputting an abnormal increase detection signal and the means for outputting an abnormal decrease detection signal are configured to refer to a reference signal, which is one of the drive instruction signal and a reference voltage, which relates to a voltage of the power supply,
the means for generating the pulse width modulation signal is configured to compare a signal-instruction level of the pulse width modulation signal with a 100%-instruction level, which corresponds to the pulse width modulation signal at substantially 100% duty, and
the means for generating the pulse width modulation signal is configured to replace the reference signal from the drive instruction signal to the reference voltage when detecting that the signal-instruction level is greater than the 100%-instruction level.

15. The load control apparatus according to claim 14, wherein the means for outputting a normally operating signal is configured to output the normally operating signal, which reflects the applied voltage.

16. The load control apparatus according to claim 15,
wherein the applied voltage is a level signal, which is obtained by smoothing voltage applied to the load,
the means for outputting an abnormal increase detection signal and the means for outputting an abnormal decrease detection signal are configured to refer to the applied voltage as the level signal, and
the means for outputting a normally operating signal is configured to generate a duty signal according to the applied voltage as the level signal and configured to output the duty signal as the normally operating signal.

17. The load control apparatus according to claim 14, wherein
the means for outputting an abnormal increase detection signal and the means for outputting an abnormal decrease detection signal are configured to output the abnormal increase detection signal and the abnormal decrease detection signal indicating the high level and the low level, which are different in level.

18. The load control apparatus according to claim 17, wherein the means for outputting a normally operating signal is configured to generate a pulse signal, which has a constant duty ratio, and configured to output the pulse signal as the normally operating signal.

19. A load control apparatus configured to output a pulse width modulation signal to a switching element, which is connected between a power supply and ground in series with a load, and configured to control the switching element according to an external drive instruction signal, the load control apparatus comprising:

means for outputting an abnormal increase detection signal when detecting an abnormal increase in applied voltage, which is applied to the load, relative to target voltage;

means for outputting an abnormal decrease detection signal when detecting an abnormal decrease in the applied voltage relative to the target voltage;

means for outputting a normally operating signal according to an output of the pulse width modulation signal when the load normally operates; and means for
generating a combined signal by combining the abnormal increase detection signal received from the means for outputting an abnormal increase detection signal, the abnormal decrease detection signal received from the means for outputting an abnormal decrease detection signal, and the normally operating signal received from the means for outputting a normally operating signal such that the abnormal increase detection signal, the abnormal decrease detection signal, and the normally operating signal are distinguishable from each other, and
outputting the combined signal via a common signal output terminal; and means for monitoring a state of the combined signal outputted from the common signal output terminal to detect the abnormal increase in applied voltage, the abnormal decrease in the applied voltage, and normal operation of the load, wherein the abnormal increase detection signal indicates the abnormal increase in applied voltage, the abnormal decrease detection signal indicates the abnormal decrease in the applied voltage, and the normally operating signal indicates the normal operation of the load.

\* \* \* \* \*